3,341,462
MODIFIED POLYISOCYANATE COMPOSITIONS
Andrew Shultz, Amherst, and Melvin Kaplan, Tonawanda, N.Y., assignors to Allied Chemical Corporation, New York, N.Y., a corporation of New York
No Drawing. Filed Mar. 27, 1964, Ser. No. 355,417
6 Claims. (Cl. 252—182)

This invention relates to novel polyisocyanate compositions and more particularly relates to undistilled diisocyanate compositions having a viscosity within the range of 20 and 10,000 cps. at 25° C. and an amine equivalent within the range of 90 to 125. It concerns especially such compositions wherein the diisocyanate component is tolylene diisocyanate.

Diisocyanates, and especially toluene diisocyanates, are important industrial products useful in the manufacture of urethane polymers. They are produced commercially by phosgenation of diamines or mixtures thereof in the presence of a solvent and thereafter the phosgenation mixture is distilled to recover solvent and the diisocyanates or mixtures thereof. For example, a mixture of 2,4- and 2,6-toluene diamines, prepared by dinitration of toluene and reduction of the resultant mixture of dinitrotoluenes, is phosgenated in the presence of a chlorinated benzene solvent and the solvent solution of the phosgenation product is fractionally distilled to recover solvent and tolylene diisocyanates, usually a mixture comprising about 80% of the 2,4- and about 20% of the 2,6-tolylene diisocyanates. During the phosgenation and subsequent distillation both of which steps involve subjecting the highly reactive diisocyanate composition to elevated temperature, polymerization and decomposition of the desired diisocyanate products unavoidably occur, resulting in substantial losses of valuable products.

It has been proposed to avoid, in part at least, such losses of valuable material by eliminating, in part or entirely, the distillation of the phosgenation mixture after removal of the solvent. Indeed, it has been fortuitously discovered that the essentially solvent-free undistilled phosgenation product obtainable under certain reaction conditions has valuable advantages over the distilled diisocyanate product; notably this product can be reacted with polyfunctional polyols to produce cellular urethanes by the "one-shot" procedure. Heretofore such urethanes prepared by the "one-shot" procedure utilizing distilled diisocyanates were unsatisfactory as to dimensional stability and other properties. The elemination or substantial reduction of the costly and time consuming fractional distillation step from the synthesis of such undistilled diisocyanate products represents a distinct economic advance in this art wherein the utilization of the undistilled phosgenation products has been a valuable contribution to the technology of the preparation of urethane polymers.

We have observed, however, that the undistilled isocyanate residue after removal of the solvent fraction is generally unsatisfactory in at least one important aspect. The viscosity of the toluene diamine phosgenation product prior to distillation is unsatisfactorily low, i.e. below 20 cps. (measured at 25° C.). Such a low viscosity product is of poor compatability with the other components of the polymerization mixture. In the equipment used in the commercial manufacture of urethane polymers, the isocyanate and active hydrogen containing components are blended in high speed mixing chambers wherein the components are held for relatively short periods of time during which blending to the state of substantial homogeneity must take place. It is thus apparent that compatability of at least the major reactants is essential to the production of high quality urethane polymers.

It has been proposed to overcome this major deficiency in the solvent-free undistilled phosgenation products by continuing the distillation of the solvent-free phosgenation product until the viscosity and other characteristics of the residue, has increased to within a desired predetermined range. In this way, the crude phosgenation product can be processed by removal of diisocyanate material to obtain an undistilled phosgenation product having a viscosity and amine equivalent ("content of polyfunctional material") within predetermined values and such a product is useful for the preparation of rigid cellular urethanes by the "one-shot" procedure which cellular products have excellent dimensional stability.

This proposed procedure has disadvantages also. The adjustment of the viscosity often requires the removal by distillation of considerable amounts, up to 50% or more, of the diisocyanate material. This in effect reduces the effective capacity of the equipment to produce the undistilled phosgenation product which may be more desirable to produce than tolylene diisocyanate depending on market conditions, and also reduces the yield of such product. The adjustment step is accomplished by vacuum fractional distillation which is a relatively expensive procedure to install and operate and hence increases the cost of the desired product.

It is, therefore, a principal object to provide novel compositions of substantially solvent-free undistilled toluene diamine phosgenation products comprising essentially diisocyanates which are suitable for the production of rigid cellular urethanes.

Another object is to provide novel compositions of substantially solvent-free undistilled toluene diamine phosgenation products comprising essentially diisocyanates which compositions have a viscosity within the range of 20 to 10,000 cps. at 25°.

A particular object of this invention is to provide novel compositions of solvent-free undistilled toluene diamine phosgenation products having a viscosity within the range of 20 and 150 and an amine equivalent within the range of 90 and 125.

Still another object is to devise a process for preparing substantially solvent-free undistilled toluene diamine phosgenation products comprising essentially toluene diisocyanates.

These and other objects will be obvious from the following description of our invention.

We have found that the viscosity and polyfunctional isocyanate content of undistilled phosgenation product of toluene diamine can be adjusted to within desirable ranges by the addition thereof, either before or after removal of solvent of a small amount, generally less than about 7% and preferably within the range of about 3 to 6% by weight of the phosgenation reaction product, of a difunctional material, preferably an aliphatic diol compound and thereafter removal of the solvent, if present, continuing distillation of the mixture to remove a relatively minor portion of tolylene diisocyanate to attain a viscosity and amine equivalent within the desired range.

This new process makes possible the preparation of novel undistilled toluene diamine phosgenation products comprising essentially diisocyanates, which are equivalent in function as components of "one-shot," rigid cellular urethanes to the aforesaid known compositions, in a more convenient and more economical manner. Moreover by substantially reducing the amount of diisocyanate which must be distilled from toluene diamine phosgenation product in order to obtain the desired viscosity and content of polyfunctional isocyanate components the yield of desired composition is proportionately substantially increased.

The undistilled phosgenation product of this invention is derived from toluene diamine and especially from a mixture of about 80% 2,4- and about 20% 2,6-toluene diamines.

The undistilled toluene diamine phosgenation mixture is reacted with a difunctional material in order to produce the novel compositions of this invention. This reactant can be a hydroxy terminated polyester such as the reaction product of a glycol, e.g., diethylene glycol with a mixture of adipic and phthalic acids having an acid number below 10 or more preferably an aliphatic diol. The following are typical of these preferred reactants ethylene glycol
diethylene glycol
1,2-dipropylene glycol
1,3-dipropylene glycol
1,4-butane diol
1,6-hexane diol Mixtures of these and equivalent difunctional materials are contemplated for this purpose, also.

The amount of difunctional material used can vary over a considerable range and will depend to a major extent upon the desired qualifications, i.e., viscosity of the toluene diamine phosgenation product composition. In most instances, these qualifications are determined by the use to which the composition is to be put. For example, an undistilled solvent free phosgenation product comprising essentially toluene diisocyanates which is to be used for the production of rigid foams by the "one-shot" procedure should have a viscosity of at least 20 cps. and an amine equivalent greater than 90. Such a composition can be obtained by the addition of a relatively small amount of a polyol described above, generally within the range of about 3 to 6% by weight of the phosgenation mixture (not including solvent), preferably after substantially completely removing the solvent and heating the resultant mixture at a moderate temperature, e.g., 60° to 70° C., for a short period sufficient to insure complete reaction of the difunctional material with the isocyanate component. Thereafter, the low boiling constituents ("lites cut"), usually amounting to about 2 to 5% of the mixture, are removed by distillation and the residual mass is checked to insure that the viscosity and amine equivalent are within the desired range. At this stage it is preferred to make any further adjustments in amine equivalent and/or viscosity by distillation of toluene diisocyanate, which adjustment is usually accomplished by distillation of relatively small amounts, less than about 30% of the mixture (by weight).

The amount of diol used varies with the molecular weight of the diol. That is to say, the greater the molecular weight of the diol or other difunctional material the more of this diol is required to produce the desired increase in viscosity in accordance with our invention.

The amine equivalent of these novel compositions can be increased by increasing the amount of toluene diisocyanate removed from the toluene diamine phosgenation product, as indicated above.

The amine equivalent of isocyanate containing compositions is measure by a well known analytical procedure and is a measure of isocyanate equivalent weight. This procedure involves reacting a measured sample of the isocyanate composition with an excess of n-butyl amine and back titrating the excess of n-butyl amine with standard hydrochloric acid. The result, "amine equivalent," is the weight of the isocyanate composition containing 1 equivalent weight (42 grams) of NCO-group.

The term "undistilled phosgenation product" as used herein is intended to designate the reaction product of toluene diamine, or mixtures of such diamines, with phosgene, which product may or may not contain a solvent and from which reaction product none or a portion of the organic diisocyanate corresponding to the organic diamine has been removed by distillation.

The following examples will illustrate the present invention. Parts and percentages are by weight and temperatures are given in degrees centigrade.

EXAMPLE I

A. To 1853 parts of hot (65°) solvent-free undistilled phosgenation product derived from a mixture of about 80% 2,4- and about 20% 2,6-toluene diamines and having a viscosity at 25° of about 15 cps., 74 parts of 1,2-dipropylene glycol are added dropwise, during about 30 minutes. The reacting mass is maintained at 70° to 75° during the addition and for about one hour thereafter. The mixture is permitted to cool to about 25° in an inert atmosphere (nitrogen) and to stand for about 16 hours. The mixture is then distilled to remove as a "lites cut," 43 parts of material distilling at 51° to 146°/47 to 45 mm. Hg. The distillation is continued to remove 66 parts of tolylene diisocyanate at 103°/3 mm. Hg. A total of 1818 parts of residue having a viscosity of 23.0 cps. at 25.5° and an amine equivalent of 114.1 are obtained.

B. For comparison, 2216 parts of the same lot of solvent-free undistilled phosgenation product used in part A above is processed by merely distilling off "lites" and tolylene diisocyanate. The "lites cut" amounted to 111 parts and 885 parts of tolylene diisocyanate are removed. The viscosity of the residue 1222 parts is 42 cps. at 26° and its amine equivalent is 109. Thus in accordance with our novel process, an improved toluene diamine phosgenation product is obtained in better than 97% yield whereas omitting the step of reacting the undistilled phosgenation product with the difunctional material results in a yield of only 55% of isocyanate material of comparable viscosity and amine equivalent.

EXAMPLE II

The toluene diamine phosgenation products prepared in the above example can be used to prepare rigid cellular urethanes by the "one-shot" procedure as follows:

A premix is prepared by mixing the following components.

160 parts of polyether triol ("Niax Triol LK-380," having a hydroxyl number of 375-380, an acid number less than 1 and a water content less than 1%)
15 parts of tetra(hydroxypropyl)ethylenediamine ("Quadrol")
1.5 parts of silicone emulsifier ("Silicone L-520")
1.2 parts of dibutyl tin dilaurate ("Catalyst D-22")
57.0 parts of trichloromonofluoromethane ("Genetron 11")

The toluene diamine phosgenation products prepared as in Example I, parts A and B, are each added to a premix of the above composition in the proportions of 235 parts of premix to 154 parts of phosgenation product of part A and 164 parts of premix to 96.5 parts of phosgenation product of part B. The mixtures are agitated for about 20 to 35 seconds permitted to expand to maximum volume and then to stand at ambient temperature for about 16 hours. The resultant cellular products have the characteristics set out in Table I, below.

TABLE I

| Property | Foam from Phosgenation Product of— | |
|---|---|---|
| | Ex. IA | Ex. IB |
| Density, lbs. ft.³ | 1.6 | 1.7 |
| Porosity, percent open cells | 4 | 7.5 |
| Friability | (¹) | (²) |
| Compression load: | | |
| At yield point, p.s.i. | 14 | 24 |
| At 10% deflection, p.s.i. | 16 | 29 |
| Dimensional stability, percent volume change: | | |
| 24 hours at 70° | 3 | 1.2 |
| 24 hours at −30° | 3 | −1.7 |

¹ None.
² Slight to appreciable.

The above results indicate that the two cellular products are about equivalent in physical properties and are typical of the excellent products obtainable by "one-shot" precedures from undistilled toluene diamine phosgenation products.

It can thus be seen that an effective and economical method has been provided to prepare undistilled phosgenation compositions derived from organic diamines and that the novel compositions are highly suitable for the production of rigid cellular urethanes by the "one-shot" technique.

Although certain preferred embodiments of the invention have been disclosed and illustrated in the examples it will be evident that various changes and modifications in these details may be made without departing from the scope or spirit of our invention.

We claim:

1. In a process for the production of polyisocyanate compositions adapted for use in the production of "one-shot" cellular urethanes by phosgenation of toluene diamines in the presence of a solvent, to produce a toluene diamine phosgenation product, the improvement which comprises adding a difunctional active hydrogen containing material selected from the group consisting of a diol or a hydroxy terminated polyester thereof, said difunctional active hydrogen containing material consisting solely of carbon, hydrogen and oxygen, to said toluene diamine phosgenation product in an amount within the range of about 3% to about 7% by weight of the toluene diamine phosgenation product and thereafter distilling said mixture to remove volatile constituents until the resultant distilland has a viscosity of at least 20 cps. at 25° C. and an amine equivalent within the range of 90 and 125.

2. A polyisocyanate composition adapted for use in the production of "one-shot" cellular urethanes consisting essentially of a substantially solvent-free toluene diamine phosgenation product obtained by phosgenation of toluene diamine in the presence of a solvent and distillation to remove the solvent, said product having incorporated therein a difunctional active hydrogen containing material selected from the group consisting of a diol or a hydroxy terminated polyester thereof, said difunctional active hydrogen containing material consisting solely of carbon, hydrogen and oxygen, in an amount within the range of about 3% to about 7% by weight of the toluene diamine phosgenation product, said mixture having a viscosity within the range of 20 and 10,000 cps. at 25° C. and an amine equivalent within the range of 90 and 125.

3. A process as defined in claim 1 wherein said difunctional active hydrogen containing material is a glycol and is added in an amount within the range of about 3% to about 6% by weight of the toluene diamine phosgenation product.

4. A process as defined in claim 1 wherein said difunctional active hydrogen containing material is 1,2-dipropylene glycol and is added in an amount within the range of about 3% to about 6% by weight of the toluene diamine phosgenation product.

5. A polyisocyanate composition as defined in claim 2 wherein said difunctional active hydrogen containing material is a glycol and is present in an amount within the range of about 3% to about 6% by weight of the toluene diamine phosgenation product.

6. A polyisocyanate composition as defined in claim 2 wherein said difunctional active hydrogen containing material is 1,2-dipropylene glycol and is present in an amount within the range of about 3% to about 6% by weight of the toluene diamine phosgenation product.

References Cited

UNITED STATES PATENTS

| 3,203,931 | 8/1965 | Swart | 260—77.5 |
| 3,217,024 | 11/1965 | Park et al. | 260—77.5 XR |
| 3,218,348 | 11/1965 | McElroy et al. | 260—77.5 |
| 3,234,184 | 2/1966 | McShane et al. | 260—77.5 |
| 3,242,139 | 3/1966 | Long | 260—77.5 |

FOREIGN PATENTS

| 994,890 | 6/1965 | Great Britain. |

LEON D. ROSDOL, *Primary Examiner.*

M. WEINBLATT, *Examiner.*